Sept. 28, 1965    R. HIMELSBAUGH    3,209,107
THERMOSTATS, MOTOR PROTECTORS OR THE LIKE HAVING GENERALLY
OCTAGONAL SHAPED AND IMPROVED SEALING END
Filed July 26, 1962

*INVENTOR.*
RUDOLPH HIMELSBAUGH
BY Oldham & Oldham
ATTYS.

United States Patent Office 3,209,107
Patented Sept. 28, 1965

3,209,107
THERMOSTATS, MOTOR PROTECTORS OR THE LIKE HAVING GENERALLY OCTAGONAL SHAPED AND IMPROVED SEALING END
Rudolph Himelsbaugh, North Royalton, Ohio, assignor to Thermal Engineering and Design Company, Akron, Ohio, a partnership
Filed July 26, 1962, Ser. No. 212,572
5 Claims. (Cl. 200—138)

The present invention relates to thermostats, motor protectors and the like, and especially to an improved sealing assembly of generally octagonal shape in section for an initially open end of a thermal protector.

Heretofore various types of thermal protectors have been made, and some of such protectors have included metallic casings having one permanently closed end and one initially open end through which the operative members for the protector are inserted for assembly into the finished thermal protector. The initially open ends in these casings have usually been flattened, or deformed to squeeze insulation means down tightly around the operative members in the thermal protector. One example of prior types of constructions is that shown in Webking U.S. Patent No. 2,855,485.

While previous types of thermal protectors of various types have been made and sold in large quantities and have given good results, it always has been difficult to provide and maintain a good permanent seal around the initially open end or ends in the thermal protector. In some instances, relatively wide flattened sections have been formed at the end of the casing, as shown in the said Webking patent, so that relatively long lever arms are provided in the deformed portions of the casing, and which lever arms have expansion forces exerted thereon tending to spring parts of the casing apart and form leaks adjacent the lateral margins of the casing.

In the manufacture of many electric motors, the production assembly requires that the motor protector be assembled in the motor stator after which the stator is heated to 300° F., or above to drive out as much air as possible from the stator wires. Then the stator is dipped into a thin, penetrating insulating varnish which usually is at about room temperature. The stator is promptly removed from the varnish and is slowly dried, or baked up to temperatures of about 300° F. Usually the stator is then inverted and the dipping and drying actions are repeated. Hence, the motor protector should be able to withstand these dipping and baking actions without contamination.

Furthermore, in the manufacturing operations required to produce prior types of casings and seal them to make an operative unit, in some instances the round tubes have cracked or broken at the worked area when flattened in the manner required to make seals as taught in the prior art procedures.

The general object of the present invention is to avoid and overcome the foregoing and other difficulties with prior types of thermal protectors, and to provide a thermal protector characterized by the provision of a substantially octagonal, in section, sealing portion at the initially open end of the casing for mounting the operative components of the thermal protector and for closing and/or sealing the initially open end of the thermal protector casing.

Another object of the invention is to provide a thermal protector wherein the protector includes a metallic casing of generally tubular form in cross section and with at least one initially open end therein being sealed or deformed to seal such end around the operative components of the thermal protector and with such deformed section of the casing being no larger than the diameter of the unworked portion of the casing.

Another object of the invention is to provide a thermal protector wherein the insulation material positioned within the casing has no severe bends in it at the sealed portion of the casing, and with the metal in the casing at the sealed portion thereof being only deformed or worked within safe operating limits, and with the casing wall usually being thickened at the vertical portions of the casing at the sealing zone, or portion therein.

Further objects of the invention are to reduce the amount of staking required in thermal protectors to aid in its calibration, to form smaller lever arms in the casing at the sealed zone thereof than were present in the prior types of constructions, to permit the use of additional layers of insulation in the protector, if desired, to avoid severe bends in the insulation means used in the thermal protector of the invention, and to provide a novel, improved finished sealing shape in the thermal protector of the invention.

The foregoing and other objects and advantages of the invention will be made more apparent as the specification proceeds.

Attention now is particularly directed to the accompanying drawings, wherein.

When referring to corresponding members shown in the drawings and referred to in the specification, corresponding numerals are used to facilitate comparison therebetween.

Figure 1:
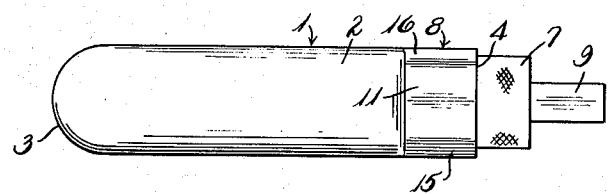
FIG. 1 is a plan view of a thermal protector embodying the principles of the invention.
Figure 2:
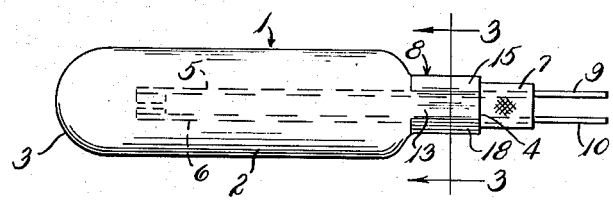
FIG. 2 is a side elevation of the protector of FIG. 1.

In general, the present invention relates to a thermal protector including a tubular casing, a bi-metal strip extending into the casing as cantilever from one supported section thereof, and insulation means separating the strip from the casing, the insulation means supporting the strip in said casing, the casing being secured around the insulation means by a deformed section of the casing, which section is of generally octagonal shape in section and of no greater width than the original diameter of the casing.

Reference now is made to the details of the structure shown in the drawings, and a thermostat 1 is shown as an embodiment of the thermal protector of the invention. This thermostat 1 includes a tubular metal casing 2 which in the present embodiment of the invention includes one initially or permanently closed end 3 and one initially open end 4. A conductive arm 5 in the form of a temperature sensitive member, usually a bi-metal strip, extends into the tubular casing 2 as a cantilever whereas a second conductive arm, or spring arm 6 also is shown extending into the casing 2 from the open end 4 thereof. Both the bi-metal arm 5 and the conductive arm 6 are positioned in the casing 2 by means of a suitable insulation material 7. This insulation material may be of any conventional construction, for example, in the form of Fiberglas layers that may have a plastic material impregnating such Fiberglas, or the insulation may be of other suitable construction so that the insulation material will be positioned around and between the arms 5 and 6 to insulate them from each other and from the casing 2.

The casing 2 is deformed, or compressed, at a section 8 thereof, and as a feature of the invention, this deformed section 8 of the casing 2 is formed to be of substantially octagonal shape in vertical section. By deforming the casing 2 adjacent the open end 4 thereof, the casing 2 brings the insulation 7 into tight sealing engagement with the arms 5 and 6 for positioning them as cantilevers to extend into the casing for control of an electrical circuit through any conventional contact means secured to the cantilever portions of the arms 5 and 6. Any suitable terminal means, or strips 9 and 10 may be secured to, or formed integrally with the arms 5 and 6 and extend from the casing for connecting the thermostat 1 into an operative circuit to be controlled by the thermostat 1 of the invention.

The deformed area or section 8 of the casing preferably has upper and lower primary sealing portions or sections 11 and 12, respectively. These primary sections or portions 11 and 12 are parallel with each other and normally are parallel to adjacent portions of the arms 5 and 6, while secondary parallel sealing portions 13 and 14 are provided and extend normal to the primary portions 11 and 12. It will be seen that the secondary deformed portions 13 and 14 are relatively short in relation to the length or width of the primary sealing portions 11 and 12, and flat connector portions 15, 16, 17 and 18 are formed between adjacent margins of the primary and secondary portions in the deformed end of the casing whereby a compact, very sturdy seal has been provided for the initially open end of the casing 2. The deforming or compressing of the deformed section 8 of the casing may be provided, for example, by a cold forge action, and the secondary portions 13 and 14 may be slightly thickened in relation to the thickness of the original walls of the casing 2.

Figure 3:
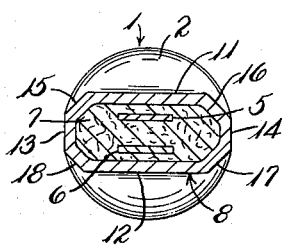
FIG. 3 is an enlarged vertical cross section taken on line 3—3 of FIG. 2.

FIG. 3 of the drawings best shows that none of the insulation 7, if originally provided in layer or tubular form, needs to be severely deformed in order to maintain a completely effective seal at the initially open end of the casing 2, and it also should be particularly noted that no portion of the deformed section 8 of the casing is any larger than the diameter of the undeformed portion of the casing 2. Hence, the casing 2 and the thermostat 1, when in its final condition, can be inserted through a hole in which the casing 2 of the thermostat is to be permanently received or positioned.

Some thermostats and motor protectors in the prior art have been calibrated by the provision of transverse staking lines and other means at the sealed end of the thermostat casing. Thus one or more transversely extending staking lines (not shown) can be formed on the deformed section 8 of the casing on the primary sealing portions 11 and 12 to form integral ribs on such sealing portions. The staking provides primary support areas for the arms 5 and 6 and are used to aid in bending this deformed end with relation to the remainder of the casing 2 for calibrating the positioning of the arms 5 and 6 extending into the casing 2 for circuit make and break action.

Figure 4:
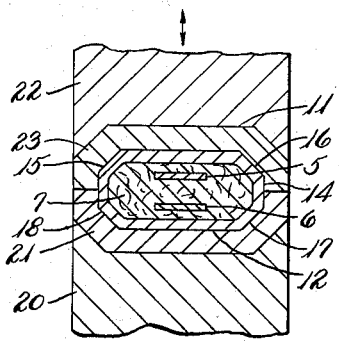
FIG. 4 is a section of a die used in forming the thermal protector of the invention.

FIG. 4 shows that the metal casing 2 is positioned, for example, in a die 20 having a die insert 21 therein shaped to the desired form of the lower half of the metal casing. A second die 22 with an insert 23 therein is brought into contact with the upper surface of the metal casing. These dies 20 and 22, or the inserts 21 and 23 when used, are shaped to engage the entire periphery of the metal casing 2 and cold work it to the shape shown. It will be seen that the metal casing is confined against lateral expansion that an effective compression or squeeze action is obtained on the complete periphery of the casing to force the casing and insulation means into tight sealed engagement with the arms 5 and 6 and support them as cantilevers extending into the metal casing 2.

Figure 5:
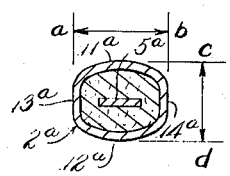
FIG. 5 is a vertical cross section of a modification of the invention taken at the sealed end thereof.

While the octagonal shape for the sealed end of the motor protector gives excellent properties, it is possible to modify such shape to a generally octagonal, or modified oval form as shown in FIG. 5. A casing 2a, of tubular or oval shape, is shown and it has vertically extending portions 13a and 14a at its lateral margins, which portions are normal to the longitudinally extending center plane of the casing. Insulation means and a temperature responsive member 5a are received within the casing 2a. Another conductive arm may be positioned in the casing 2a. In sealing an initially open end of the casing 2a, such end is compressed but is not laterally expanded. Hence the dimensions a–b, and c–d are less than the original width, and height, respectively, of the casing and no dimension of the compressed or worked sealed end exceeds that of the original casing. The top and bottom surfaces 11a and 12a may be flat, or flattened arcs extending in a general direction normal to the sides 13a and 14a. Such sealed end in all events has no sharp corners and has arcuate portions connecting the vertically extending portions 13a and 14a to the top and bottom parts of the sealed end of the motor protector.

In shaping or working the casings to seal an end thereof, the inner corners of the worked end would have slight radii formed thereon to blend the worked portions of the casing together with a minimum, or no danger of the casing splitting, or cracking.

From the foregoing, it will be seen that the metal forming the initially open end of the casing has been only worked or deformed a relatively minimum distance, and that only relatively short lever arms are provided in the casing to exert any extending action therein tending to open the casing or destroy the seal provided in the initially open end thereof. The cold worked metal in the casing has maximum physical properties at the deformed area 8 thereof to aid in maintaining an effective seal.

In some instances, the sealing action shown in the thermostat 1 can be used in other similar motor protectors, or thermal controls wherein both ends of the thermostat might initially be open, and the type of seal provided may also be used in thermal protectors wherein only one bi-metal arm would extend into the casing which may itself be conductive to form a part of the controlled circuit.

It is a feature of the temperature sensitive materials used, such as the bi-metal arm 5, that they will change their longitudinal curvature with changes in temperature to provide the desired control action.

In view of the foregoing, it is believed that the objects of the invention have been achieved by the provision of a thermal control with an improved type of sealed end therein.

While two complete embodiments of the invention have been disclosed herein, it will be appreciated that modification of such embodiments of the invention may be resorted to without departing from the scope of the invention as defined in the appended claims.

What is claimed is:

1. In a thermal protector, thermostat, or the like, an elongated metal casing having one permanently closed end and one open end, a pair of flat in section conductive arms one of which is a temperature sensitive member adapted to change its longitudinal shape with temperature changes and insulation means positioned between and around said conductive arms to insulate them from each other and from said casing, said conductive arms extending into said casing as cantilevers, said casing being compressed and deformed to a smaller cross sectional area than its original area at its initially open end to squeeze against said insulation means and to provide a pressure seal around said conductive arms and so seal the initially open end of said casing, the deformed end of said casing being continuous and of outer dimensions no greater than the original dimensions of said casing, said deformed end being of generally octagonal shape in section and including upper and lower at least substantially flat portions parallel to said arms and a pair of at least substantially flat edge portions extending perpendicular to said upper and lower flat portions.

2. In a thermal protector, thermostat, or the like, an elongated metal casing having at least one initially open end, a conductive arm which is a temperature sensitive member adapted to change its longitudinal shape with temperature changes, and insulation means positioned in said casing around said conductive arm, said casing being compressed at said initially open end to squeeze said insulation means around said conductive arm and to pressure seal the initially open end of said casing, the deformed end of said casing being of outer dimensions no greater than those of the uncompressed portions of said casing and being of smaller sectional area than underformed sections of said casing, said deformed end having a pair of parallel flat side portions therein normal to the center horizontal plane of said casing and having a pair of at least substantially flat opposed top and bottom portions, at least some of the wall of said deformed end being thicker than the wall of undeformed parts of said casing.

3. In a thermal protector, thermostat, or the like, an elongated metal casing having at least one initially open end, a conductive arm adapted to change its longitudinal shape with changes in operative conditions, and insulation means positioned in said casing around said conductive arm at said initially open end, said conductive arm extending into said casing from said open end thereof as a cantilever, said casing being compressed at said initially open end to squeeze said insulation means around said conductive arm and to form a pressure seal at said initially open end of said casing, the deformed end of said casing being of one outer dimension less than the corresponding original dimension of said casing and being of smaller cross sectional area than undeformed sections of said casing, said deformed end being continuous and having at least portions of its casing wall thicker than the wall of undeformed parts of said casing, said deformed end having no outer dimension greater than the outer dimensions of the undeformed parts of said casing.

4. In a thermal protector, thermostat, or the like, an elongated metal casing having an initially open end, a conductive arm which is adapted to change its longitudinal shape with changes in operative conditions, and insulation means positioned around said conductive arm to insulate it from said casing, said conductive arm extending into said casing as a cantilever, said casing being deformed at said end to squeeze against said insulation means to seal it firmly around said conductive arm to close said end of said casing, said end of said casing being of smaller area than undeformed portion of said casing and being of a height less than the undeformed portions of said casing, said deformed end having at least portions of its wall thicker than the wall of undeformed portion of said casing and having pairs of opposed converging upper and lower wall sections on such deformed sealed end.

5. In a thermal protector, thermostat, or the like, an elongated metal casing having at least one initially open end, a conductive arm, and deformable insulation means positioned around said conductive arm to insulate it from said casing, said conductive arm extending into said casing as a cantilever and being operatively positioned to change its longitudinal position with changes in operative conditions, said casing being deformed at said end to squeeze against said insulation means to seal it around said conductive arm and seal said end of said casing, said end of said casing being of smaller area than undeformed portions of said casing and being of no outer dimension greater and at least one outer dimension smaller than the corresponding dimension of the undeformed portion of said casing, said deformed end having at least portions of its wall thicker than the wall of the undeformed portion of said casing and having pairs of opposed converging sections on the top and bottom parts of such deformed sealed end.

References Cited by the Examiner

UNITED STATES PATENTS

| | | | |
|---|---|---|---|
| 2,820,870 | 1/58 | Moksu | 200—138 |
| 2,871,315 | 1/59 | Dales | 200—138 |
| 3,005,069 | 10/61 | Sippach et al. | 200—138 |
| 3,025,371 | 3/62 | Medal | 200—87 |
| 3,031,551 | 4/62 | White et al. | 200—138 |
| 3,100,247 | 8/63 | Dales | 200—138 |

BERNARD A. GILHEANY, *Primary Examiner.*

ROBERT K. SCHAEFER, *Examiner.*